Dec. 5, 1933.   P BOTTCHER   1,938,007
CAR BODY FOR CLOSED PASSENGER AUTOMOBILES
Filed Oct. 8, 1930
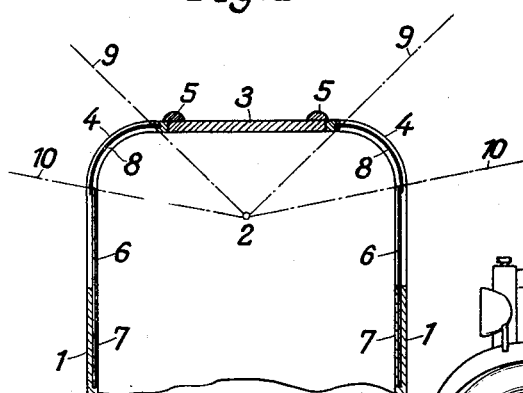
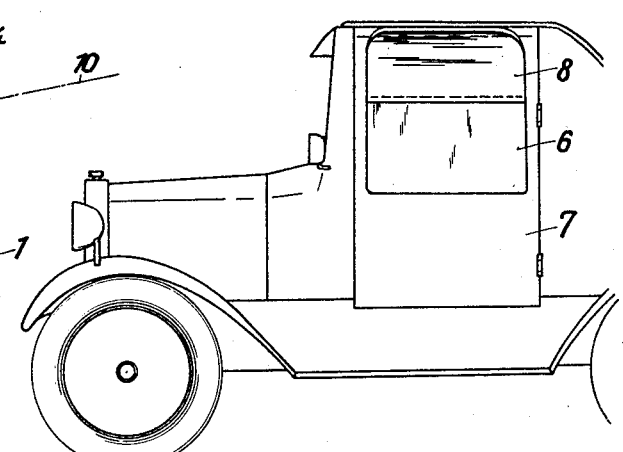
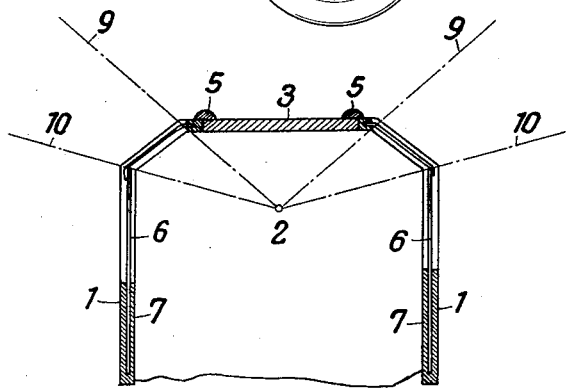
Inventor:
P. Böttcher
By: Marks & Clerk
Attys Patented Dec. 5, 1933

1,938,007

UNITED STATES PATENT OFFICE 1,938,007

CAR BODY FOR CLOSED PASSENGER AUTOMOBILES

Paul Böttcher, Altona-Bahrenfeld, near Hamburg, Germany

Application October 8, 1930, Serial No. 487,303, and in Germany July 4, 1930

3 Claims. (Cl. 296—44)

This invention relates to a car body for closed passenger automobiles.

The development of passenger automobiles is gradually leading to the building of lower types and the free head space of the closed car is being reduced to the smallest possible dimensions in order to obtain as small a building height as possible.

The decrease of the height of the car body renders it more inconvenient to get into the car and also affects the view from the car. Owing to the small height of the doors of the usual type, it is very inconvenient to get into such a low car body while the field of vision through the low window is substantially limited to that which lies in the horizontal plane.

The aforesaid drawbacks are obviated according to the present invention while substantially maintaining the low type of car body since the doors provided in the lateral or side walls of the car body are extended into the car top. It is very easy to get into the car owing to the high doors extending over the rounded edge portions of the top. If the upper parts of these doors are glazed, the passenger in the car has a free view upward so that when the car is running on a level surface he can not only see the walls of houses and the trunks of trees but also the roofs, crowns of trees and the open sky while when the car is running over hills the passenger can view the scenery with its entire range of hills, whereby the pleasure of the journey is considerably increased even with low car bodies.

Constructional forms of the subject matter of the invention are shown in the accompanying drawing by way of example.

Figure 1 is a section through a car body with rounded upper top corners and with a door designed according to the invention.

Figure 2 is a section through a car body with beveled top corners.

Figure 3 is a side elevational view of a part of a car body with a door designed according to the invention.

Similar characters of reference are employed to designate corresponding parts throughout the several views.

The doors 1 are arranged in door openings 2 which extend through the side walls of the car body and are extended into the car top 3. The door has an angularly extending upper part which lies flush with the corner portions 4 of the top. Stiffening members 5 are provided on the top 3 and overlie the upper edges of the door openings while when opening the door the door opening or space to this stiffening member is free for the entrance to the car and consequently it is very convenient for the passenger to get into the car. A sliding window frame 6, which is adapted to be lowered in a slot 7, is provided in the door in the usual manner. Above the sliding window frame 6 and within the angularly extending part of the door is a glass surface 8 which is secured in the door and adjoins the sliding window frame 6 so that it forms a unitary surface for the vision. The field of vision for a passenger seated at the point 2 of the car is thereby extended to the dotted lines 9 while according to the hitherto known designs, wherein only the vertical sliding window frames 6 were provided in the doors, the field of vision extended only to the lines 10. When the vertical sliding window frame 6 is raised, the glass surface 8 engages over the upper edge of the window frame 6 without any fastening means. However, in cases where fastening rails (not shown) are required, these are made as narrow as possible so as not to affect the view.

According to the constructional form as shown in Figure 1, the corners of the top of the car body are rounded and consequently the upper angularly extending part of the door is curved accordingly. In cars wherein the top corners are not rounded but beveled, as shown in Fig. 2, the upper part of the door is beveled and the glass surfaces are also arranged in the door accordingly.

It is believed in view of the foregoing that a further detailed description of the invention is unnecessary. Likewise it is believed that the advantages of the invention will be readily apparent.

Having thus fully described the invention, what is claimed as new and desired to be secured by Letters Patent is:

1. In a vehicle, a body having side walls, a roof joining said side walls, said walls and roof having opposed door openings extending vertically through the side walls and into the roof, doors for closing said openings each swinging on a vertical axis and including a main lower portion and an angularly bent upper portion, a sliding window frame slidable in each main lower portion and a stationary glazed member mounted in each angularly bent upper portion and positioned in overlapping engagement with the upper edges of the window frame when the latter is raised.

2. A car body having side walls and a top and provided with door openings extending vertically through the side walls and into the top and doors for closing said openings, each including a main lower portion and an angularly bent upper portion, a plane sliding window in the lower main portion of the door, and a curved stationary glazed member mounted in the angularly bent upper portion of the door and adjoining the sliding window so that it forms a unitary surface for the vision.

3. A vehicle with a body having a wall, a roof joining said wall and extending angularly therefrom, said wall and roof having an opening therein extending on both sides of the line of juncture thereof and forming a stationary frame around said opening, and a closure swinging on a vertical axis and complementary to said opening and including transparent members on both sides of the line of juncture.

PAUL BÖTTCHER.